No. 879,035. PATENTED FEB. 11, 1908.
F. B. COOK.
CABLE TERMINAL.
APPLICATION FILED MAY 28, 1906.
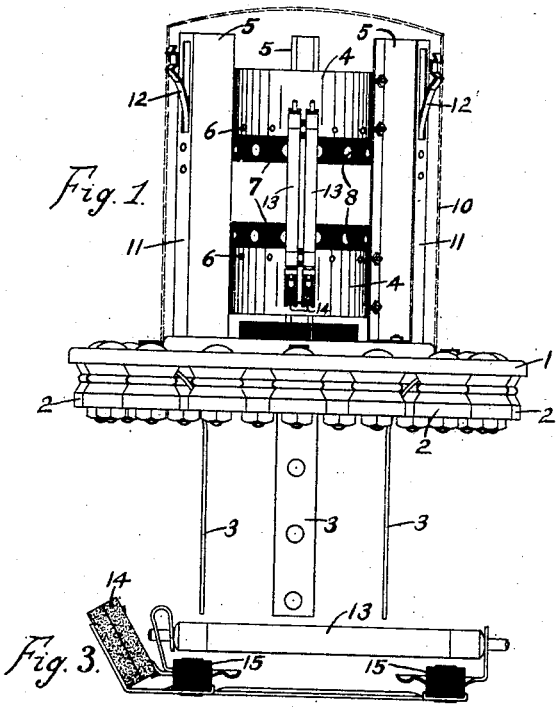
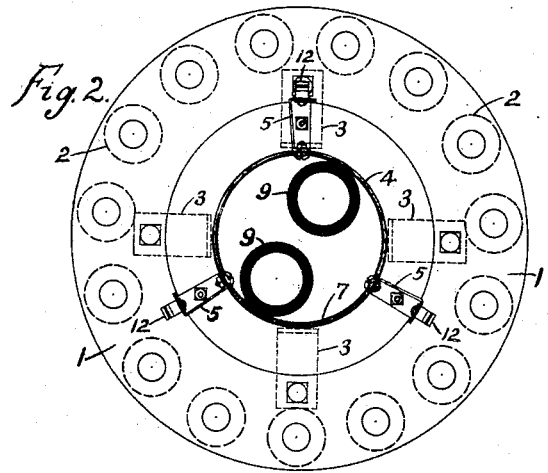
WITNESSES: Frederick R. Parker. Robert G. Parker.
INVENTOR: Frank B. Cook.

UNITED STATES PATENT OFFICE.

FRANK B. COOK, OF CHICAGO, ILLINOIS.

CABLE-TERMINAL.

No. 879,035.

Specification of Letters Patent.

Patented Feb. 11, 1908.

Application filed May 28, 1906. Serial No. 319,138.

*To all whom it may concern:*

Be it known that I, FRANK B. COOK, a citizen of the United States of America, residing at Chicago, in the county of Cook and State of Illinois, have invented a new and useful Cable-Terminal, of which the following is a specification, reference being had to the accompanying drawings, illustrating same.

My invention relates to cable terminals for telephone or telegraph systems, or the like, and more particularly to cable terminals of the open type for pot-head use.

The principal objects of my invention are to provide a sheet metal cable terminal adapted to accommodate protective apparatus circumferentially therearound; to adapt such a cable terminal to accommodate individual protector units in a vertical position therearound; to provide improved means for bringing the electrical conductors to the protective apparatus and properly distributing them; and to provide simplicity of construction, accessibility and durability in such a cable terminal. Other objects will be apparent from the following specification.

In telephone or telegraph systems, or the like, where cables are used, it is customary to provide a terminal at each point where the cable conductors are distributed, through which the latter are connected, and to provide the terminals with protective devices to protect the cable conductors from injurious electricity which may come to the cable over the aerial conductors. The protective devices usually provided at such cable terminals are fuses and lightning arresters, to protect the cable from heavy currents and from high-voltage electricity, such as lightning. Occasionally very injurious currents of electricity of a high voltage will start a fire in such a terminal if the latter is constructed of combustible material, such as wood, which fire may burn out a considerable portion of the terminal and put the circuits passing through the terminal out of service.

My invention provides a cable terminal which is made entirely of sheet metal, with the exception of a few small insulating parts, so as to eliminate the possibility of a fire occurring at the terminal under extremely dangerous electrical conditions, the sheet metal being formed and adapted to accommodate the protective devices which are mounted thereon, and to accommodate the cable conductors and aerial conductors leading to the terminal. Such a sheet metal terminal greatly simplifies the construction of such apparatus, as the sheet metal portions are formed and punched in presses, with few operations, thus doing away with the drilling, planing and grooving of wood parts. In the terminal of my present invention the sheet metal parts do not form an air-tight inclosed portion for the cable conductors, as provision is made for terminating the cable in a pot-head before it reaches the terminal and leading the weather-proof pot-head conductors to the terminal.

Referring to the accompanying drawings illustrating the preferred form of my invention, Figure 1 is a side elevation of the cable terminal of the invention; Fig. 2 is a plan view of Fig. 1; and Fig. 3 is a side elevation of an individual protector mount for the terminal of the invention.

Like characters refer to like parts in the several figures.

The individual protector mount of Fig. 3 forms the subject matter of my copending application Serial No. 356,881, filed February 11, 1907.

In the accompanying drawings 1 represents a circular distributing plate around the edge of which and on the underneath side of which is mounted a series of insulators 2 2 adapted to accommodate drop wires leading from the terminal. To the underneath side of plate 1 are secured mounting brackets 3 3 adapted to be secured to the sides of a pole around the top thereof to suitably mount the terminal on top of the pole. Sheet metal rings 4 4 are suitably held in place as shown in Fig. 1 by sheet metal channel portions 5 5 and are provided with holes 6 6 therein to accommodate bolts to secure the individual protector mounts, shown in Fig. 3, in place as shown in Fig. 1. Inside of the metal rings 4 4 are secured insulating rings 7 7 provided with holes 8 8 therein to accommodate electrical conductors leading from the interior of rings 4 4 to the protective apparatus on the outside of rings 4 4. Near the center of the distributing plate 1 and inside of the sheet metal rings 4 4 are provided insulating bushings 9 9 which extend through the plate 1 and are adapted to accommodate the cable conductors and the aerial conductors leading to the terminal. A sheet metal cover 10, shown in dotted lines in Fig. 1, is preferably placed over the terminal to inclose the protective apparatus, resting upon the distributing plate 1. The exterior flanges 11 11 of the channel irons 5 5 are preferably formed to fit the sheet metal cover 10. On the flanges 11 11 near the top ends thereof are provided spring members 12 12 adapted to spring out against the sheet metal cover 10 and hold same in place, whether the cover is placed clear down over the terminal or partially raised.

The cable leading to the terminal is preferably pot-headed and the pot-head wires extended through one of the bushings 9 and distributed out through holes 8 8 around the lower ring 7 to the protective apparatus, preferably to the end of the latter containing the carbon lightning arresters. The aerial conductors extend to the terminal through the other bushing 9 and are distributed through holes 8 8 around the upper ring 7 to the other end of the protective apparatus.

The individual protector mounts preferably comprise inclosed fuses 13 13 and lightning arresters 14 14 suitably held in place by spring members which are carried by insulating mounting portions 15 15. These individual protector units are preferably mounted to the sheet metal rings 4 4, preferably as shown in Fig. 1, and may be mounted clear around the rings 4 4, either before or after the terminal is installed. They are preferably mounted as it is desired to use them in connecting the lines through the terminal from the cable to the instruments.

It will readily be seen that this terminal is absolutely fire proof, as all inflammable materials, such as wood, are eliminated from the construction thereof.

The construction herein set forth is very accessible for connecting the several conductors to the protectors at any time, and is also very compact.

I do not wish to limit this invention to the details of construction as herein shown, as many modifications may be made therein without departing from the scope of the appended claim.

What I claim as my invention and desire to secure by Letters Patent, is:

1. A cable terminal comprising a sheet metal distributing plate, sheet metal channel portions secured to the said plate in a vertical position, sheet metal rings mounted to the said channel portions between same, and protective apparatus suitably mounted around the said sheet metal rings.

2. A cable terminal comprising metallic rings suitably mounted one above another, protective apparatus mounted around the said rings, rings of insulating material associated with the said metallic rings and provided with holes to accommodate conductors leading to the protective apparatus, and suitable means for accommodating conductors leading to the terminal.

3. A cable terminal comprising a sheet metal distributing plate, sheet metal channel portions mounted thereon in a vertical position, sheet metal rings suitably secured between the said channel portions, protective apparatus mounted to the sheet metal rings on the exterior thereof, the said distributing plate having openings therein near the center thereof adapted to permit electrical conductors to enter the terminal from the bottom of the said plate inside the said sheet metal rings, and suitable means for connecting the said electrical conductors to the protective apparatus.

4. The cable terminal comprising a horizontal base portion, a plurality of standards carried by the base portion above same and arranged substantially vertically, protector mounting rings carried by the said standards and arranged substantially horizontally one above another, individual protector units each comprising a pair of fuses and lightning arresters mounted around the said rings and arranged substantially vertically, means for accommodating electrical conductors leading to the protector units through the base portion, and a suitable cover placed over the whole so as to inclose same.

5. A cable terminal comprising a horizontal base portion, a plurality of standards carried by the base portion and arranged substantially vertically, means carried by the said standards for mounting protective devices in a cylindrical arrangement therearound, protective devices comprising fuses and lightning arresters mounted around the said protector mounting means substantially vertically, means for accommodating electrical conductors leading to the protective devices, and a suitable cover placed over the whole so as to inclose same.

6. A cable terminal comprising a horizontally arranged distributing plate, a plurality of standards secured to the said plate in a vertical position, protector mounting rings carried by the said standards between same and arranged one above another, and protective devices suitably mounted in a horizontal row around the said rings, in a substantially vertical position.

As inventor of the foregoing I hereunto subscribe my name in the presence of two subscribing witnesses, this 22d day of May, 1906.

FRANK B. COOK.

Witnesses:
FREDERICK R. PARKER,
F. W. PARDEE.